United States Patent [19]

Quate

[11] Patent Number: 5,354,985

[45] Date of Patent: Oct. 11, 1994

[54] NEAR FIELD SCANNING OPTICAL AND FORCE MICROSCOPE INCLUDING CANTILEVER AND OPTICAL WAVEGUIDE

[75] Inventor: Calvin F. Quate, Stanford, Calif.

[73] Assignee: Stanford University, Palo Alto, Calif.

[21] Appl. No.: 72,286

[22] Filed: Jun. 3, 1993

[51] Int. Cl.$^5$ ............................................. H01J 3/14
[52] U.S. Cl. ................................... 250/234; 250/306
[58] Field of Search ............... 250/234, 235, 306, 307, 250/216; 385/12

[56] References Cited

U.S. PATENT DOCUMENTS

| | | | |
|---|---|---|---|
| 3,970,887 | 7/1976 | Smith et al. | 313/309 |
| 4,917,462 | 4/1990 | Lewis et al. | 250/216 |
| 5,105,305 | 4/1992 | Betzig et al. | 250/227.14 |
| 5,227,626 | 7/1993 | Okada et al. | 250/548 |
| 5,231,286 | 7/1993 | Kajimura et al. | 250/234 |
| 5,254,854 | 10/1993 | Betzig | 250/234 |

OTHER PUBLICATIONS

R. B. Marcus, et al., "Formation of silicon tips with <1 nm radius", Appl. Phys. Lett. 54(3), Jan. 15, 1990, pp. 236–238.
R. B. Marcus, et al., "The Oxidation of Shaped Silicon Surfaces", Journal of the Electrochemical Society, Solid–State Science and Technology, Jun. 1982, pp. 1278–1282.
S. Ghandhi, "VLSI Fabrication Principles–Silicon and Gallium Arsenide", John Wiley & Sons, New York (1983), p. 373.
J. Bruger et al., "Micromachined Silicon Tools For Nanometer–Scale Science", NATO ARW on Manipulations of Atoms under High Fields and Temperatures, Lyon, France, Jul. 6–10, 1992, 7 pgs.
W. Stutius et al., "Silicon nitride films on silicon for optical waveguides", Applied Optics, vol. 16, No. 12, Dec. 1977, pp. 3218–3222.
Chen S. Tsai, "Integrated Acoustooptic Circuits and Applications", IEEE Transactions on Ultrasonics, Ferroelectrics and Frequency Control, vol. 39, No. 5, Sep. 1992, pp. 529–554.
P. K. Tien, "Integrated optics and new wave phenomena in optical waveguides", Reviews of Modern Physics, vol. 49, No. 2, Apr. 1977, pp. 361–420.
E. Betzig et al., "Near-Field Optics: Microscopy, Spectroscopy, and Surface Modification Beyond the Diffraction Limit", Science, vol. 257, Jul. 10, 1992, pp. 189–195.
R. Toledo–Crow et al., "Near-field differential scanning optical microscope with atomic force regulation", Appl. Phys. Lett. 60(24), Jun. 15, 1992, pp. 2957–2959.
E. Betzig et al., "Combined shear force and near-field scanning optical microscopy", Appl. Phys. Lett. 60(20), May 18, 1992, pp. 2484–2486.
Y. Martin et al., "Atomic force microscope-force mapping and profiling on a sub 100-Å scale", J. Appl. Phys. 61(10), May 15, 1987, pp. 4723–4729.
Thomas R. Albrecht et al., "Microfabrication of integrated scanning tunneling microscope", J. Vac. Sci. Technol. A 8 (1), Jan./Feb. 1990, pp. 317–318.
Daniel Rugar et al., "Atomic Force Microscopy", Physics Today, Oct. 1990, pp. 23–30.
Rod C. Alferness et al., "Optical Waveguides–Theory and Technology", Spring Series in Electronics and Photonics, vol. 23, Heidelberg, 1990, pp. 53–89.
N. F. van Hulst et al., "Near-field optical microscope using a silicon-nitride probe", Appl. Phys. Lett. 62(5), Feb. 1, 1993, pp. 461–463.

Primary Examiner—David C. Nelms
Assistant Examiner—Que T. Le
Attorney, Agent, or Firm—Skjerven, Morrill, MacPherson, Franklin & Friel

[57] ABSTRACT

A near field scanning optical microscope (NSOM) includes a cantilever which is aligned generally parallel to the surface of a sample. An optical waveguide extends along the cantilever to a tip which protrudes downward from the cantilever. A small aperture at the apex of the tip allows light radiation flowing through the waveguide to be directed toward the sample. The cantilever is vibrated, and variations in its resonant frequency are detected and delivered to a feedback control system to maintain a constant separation between the tip and the sample. The NSOM can also be operated as an atomic force microscope in either a contact or non-contact mode.

34 Claims, 16 Drawing Sheets

NEAR FIELD SCANNING OPTICAL AND FORCE MICROSCOPE INCLUDING CANTILEVER AND OPTICAL WAVEGUIDE

This invention was made with Government support under contract ECS-89-17552 awarded by the National Science Foundation and contract N00014-91-J-1050 awarded by the Department of the Navy. The Government has certain rights in this invention.

FIELD OF THE INVENTION

This invention relates to near field scanning optical microscopes (NSOMs) and, in particular, to an NSOM which can be used alternatively as an atomic force microscope.

BACKGROUND OF THE INVENTION

Near field scanning microscopy is a technique for analyzing objects by means of a light beam which is directed through a very small aperture. The width of the aperture is made substantially smaller than the wavelength of the light (e.g., $\lambda/40$), and the object to be studied is held in the near field of the aperture. The near field begins at the surface of the material in which the aperture is formed and extends outward a distance equal to about one-half of the width of the aperture. During scanning it is very important that the aperture be maintained at a constant distance from the sample.

A known type of NSOM is described in U.S. Pat. No. 4,917,462 to Lewis et al. An aperture probe is made in the form of a tapered metal-coated glass pipette. The pipette is formed from a glass tube drawn down to a fine tip and then coated with a metallic layer. An aperture is formed in the metallic layer at the tip. The manufacture of such a probe is a relatively expensive, time consuming process that does not lend itself to batch fabrication techniques. These drawbacks are overcome in an NSOM according to this invention.

SUMMARY OF THE INVENTION

In an NSOM in accordance with this invention, an optical waveguide, preferably planar, is formed on a cantilever which is positioned generally parallel to the surface of the sample during scanning. A tip is formed near the free end of the cantilever, and a small aperture having a width substantially less than an optical wavelength is formed at the apex of the tip. The cantilever approaches the sample until the apex of the tip is located extremely close to the sample surface. Optical radiation is introduced into the waveguide, which directs it to the tip where the radiation exits through the aperture.

In one mode of operation, the cantilever is vibrated from its fixed end. Since the apex of the tip is located extremely close to the sample surface, the resonant frequency of the cantilever is determined in part by Van der Waals forces or other forces which exist between the tip and the sample. In reality, it is the gradient of the forces that changes the resonant frequency. As the gap between the tip and the sample surface changes, these forces vary, and this variation in turn alters the resonant frequency of the cantilever.

The resonant frequency of the cantilever is detected, and a feedback system adjusts the distance between the tip and the sample so as to maintain the resonant frequency at a constant value. As a result, the gap between the sample surface and the aperture at the tip of the cantilever is held constant.

There are several ways of detecting the resonant frequency of the cantilever. In a preferred embodiment, this is accomplished by means of a piezoresistor which is embedded in the cantilever in such a way that its resistance varies as the cantilever bends. The resistance of the piezoresistor is detected, and this provides a signal indicative of the resonant frequency of the cantilever. Using this information, a feedback system of a kind well known in the art is used to control the gap between the tip and the sample surface.

In a second mode of operation, the NSOM may be operated as an atomic force microscope. The cantilever tip may be brought into contact with the surface of the sample, and the piezoresistor may be used to detect the deflection of the cantilever. A known feedback system responds to the output of the piezoresistor to maintain a constant force between the cantilever tip and the sample. Alternatively, the NSOM may be operated as an atomic force microscope in the non-contact or attractive mode. The cantilever tip is spaced a short distance from the sample, and the cantilever is vibrated. Van der Waals or other forces between the tip and the sample alter the resonant frequency of the cantilever as it is scanned over the sample. These changes are sensed with the piezoresistor and are used to generate a representation of the topography of the sample.

The NSOM of this invention is thus a very flexible instrument which can be operated in an optical mode or a variety of force modes. The cantilever can be fabricated by micromachining silicon using batch processing techniques.

DESCRIPTION OF THE INVENTION

Figure 1A:
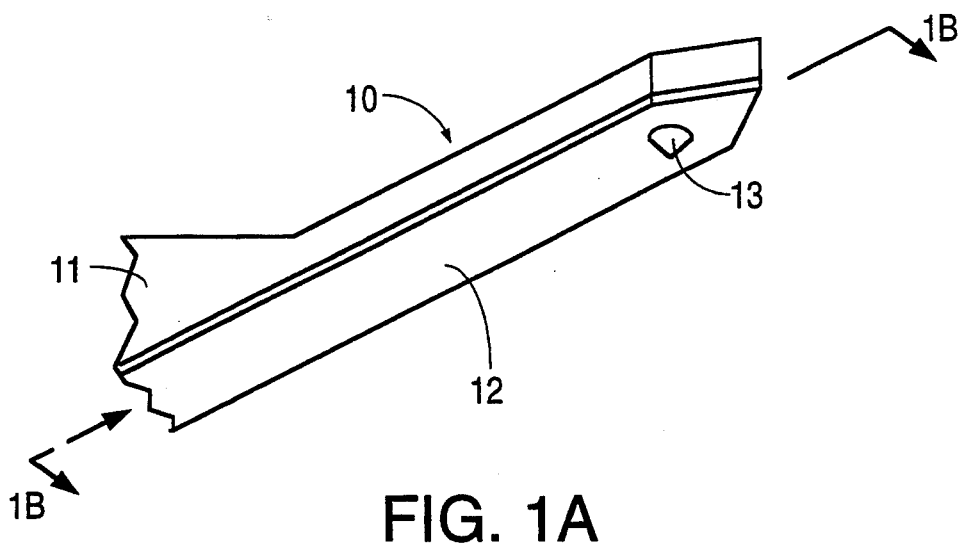
FIG. 1A illustrates a perspective view of a cantilever according to this invention, viewed from underneath.

FIG. 1A illustrates a bottom perspective view of a preferred embodiment according to this invention. A cantilever 10 is attached to a base 11 and has a planar waveguide 12 running along its bottom surface. Waveguide 12 extends to a conical tip 13 which is located near the free end of cantilever 10. An incident light beam enters waveguide 12 from the direction indicated by the arrow and is transmitted through waveguide 12 to tip 13. The light beam may be introduced into waveguide 12 by any one of several known arrangements, such as a lens, a grating or a prism.

Figure 1B:
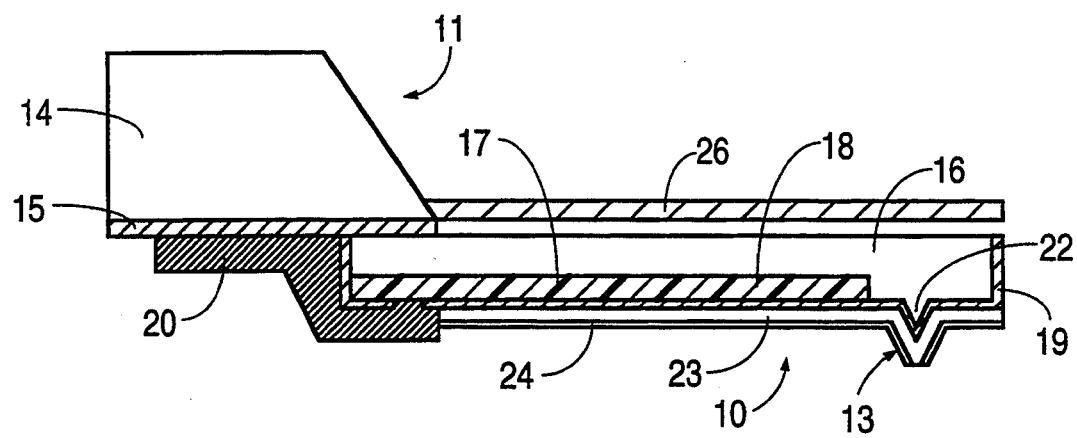
FIG. 1B illustrates a cross-sectional view of the cantilever taken at section 1B—1B shown in FIG. 1A.

FIG. 1B illustrates a cross-sectional view of cantilever 10, taken through section 1B—1B shown in FIG. 1A. Cantilever 10 is micromachined in silicon. Base 11 includes a silicon substrate 14 which is underlain by a silicon dioxide ($SiO_2$) layer 15. Cantilever 10 includes a layer 16 of intrinsic silicon as well as a layer 17, which consists of silicon doped with arsenic or boron to form a piezoresistor 18. (The thicknesses of layer 17 and the other layers shown in the drawings are exaggerated for clarity.) A $SiO_2$ layer 19 is formed on the bottom and side surfaces of piezoresistor 18 to serve as a buffer for waveguide 12. A metal layer 20 includes terminals 21A and 21B (see FIG. 1C) which make contact with piezoresistor 18. In this embodiment, $SiO_2$ layer 19 is approximately 5000 Å thick, but it may have a thickness in the range 2750–8000 Å.

A conical member 22 protrudes downward near the free end of cantilever 10. A silicon nitride ($Si_3N_4$) layer 23, which constitutes waveguide 12, is formed on the lower surface of $SiO_2$ layer 19 and conical member 22. In this embodiment, $Si_3N_4$ layer 23 is approximately 3000 Å thick. $Si_3N_4$ layer 23 is coated with an Al layer 24, which is in the range 100–1000 Å thick but preferably approximately 500 Å thick. Alternatively, Al layer 24 may be omitted and the $Si_3N_4$ layer may be bounded by air. The use of $Si_3N_4$ films as waveguides is described in an article by W. Stutius and W. Streifer, Applied Optics, Vol. 16, No. 12, December 1977, pp. 3218–3222, which is incorporated herein by reference.

The film used to carry the light waves has a thickness on the order of 1 optical wavelength. The waveguides have both transverse electric (TE) and transverse magnetic (TM) modes with discrete Eigenvalues. There are two basic types of waveguides: channel waveguides and film waveguides. In channel waveguides, whose widths are typically a few microns, the light propagation is confined within the channel. Film waveguides are much wider—thousands of wavelengths wide. The light path in the plane of the guide will follow geometric optics. A further discussion of these matters in found in P. K. Tien, "Integral Optics and New Wave Phenomena in Optical Waveguides", Rev. Mod. Phys., Vol. 49, pp. 361–420, April 1977, which is incorporated herein by reference.

FIG. 1B also shows a capacitor plate 26, which is attached to base 11 and projects over cantilever 10. Capacitor plate 26 is connected to a voltage source. (For the sake of clarity, capacitor plate 26 is not shown in FIG. 1A.) Capacitor plate 26 serves several purposes: (i) with a DC voltage on the plate the electrostatic force can displace the neutral position of cantilever 10; (ii) an AC voltage on the plate can excite the mechanical resonance of cantilever 10; and (iii) changes in the capacitance of capacitor plate 26 can be used to monitor the deflection of cantilever 10.

Figure 1C:
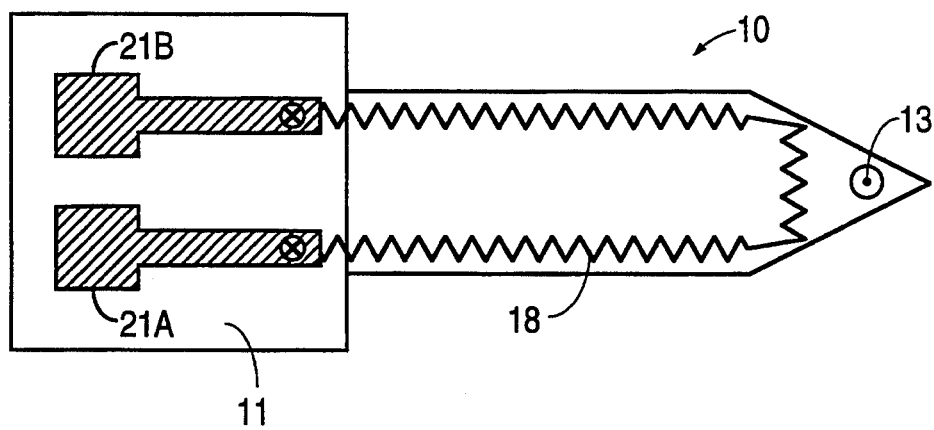
FIG. 1C illustrates a bottom plan view of the piezoresistor that is included in the cantilever.

FIG. 1C illustrates a bottom plan view of cantilever 10, showing in particular piezoresistor 18, which is U-shaped and extends between terminals 21A and 21B.

Figure 1D:
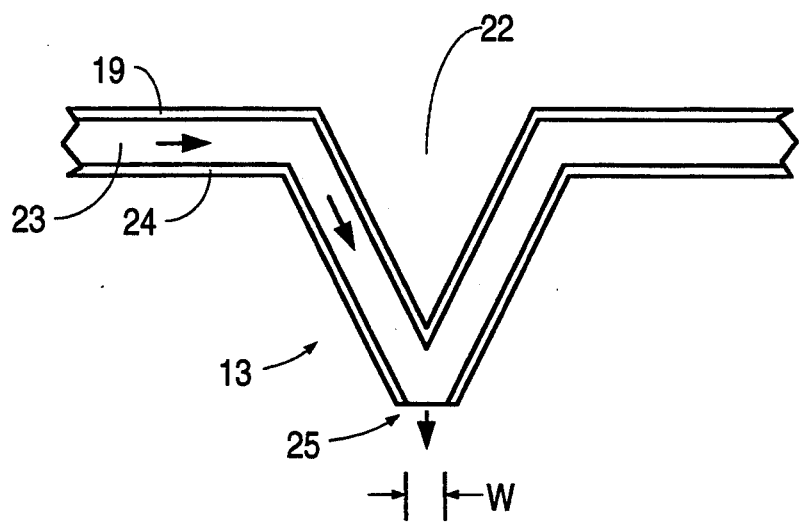
FIG. 1D illustrates a detailed cross-sectional view of the cantilever tip.

FIG. 1D illustrates a detailed cross-sectional view of tip 13, taken along the longitudinal axis of cantilever 10. As shown, $Si_3N_4$ layer 23 conforms to the shape of conical member 22. A portion of Al layer 24 is removed at the apex of tip 13 to form a small aperture 25, from which the light beam flowing through waveguide 12 emerges. In accordance with known principles of NSOM technology, the width (W) of aperture 25 should be substantially less than the wavelength ($\lambda$) of the light flowing through waveguide 12.

Figure 2:
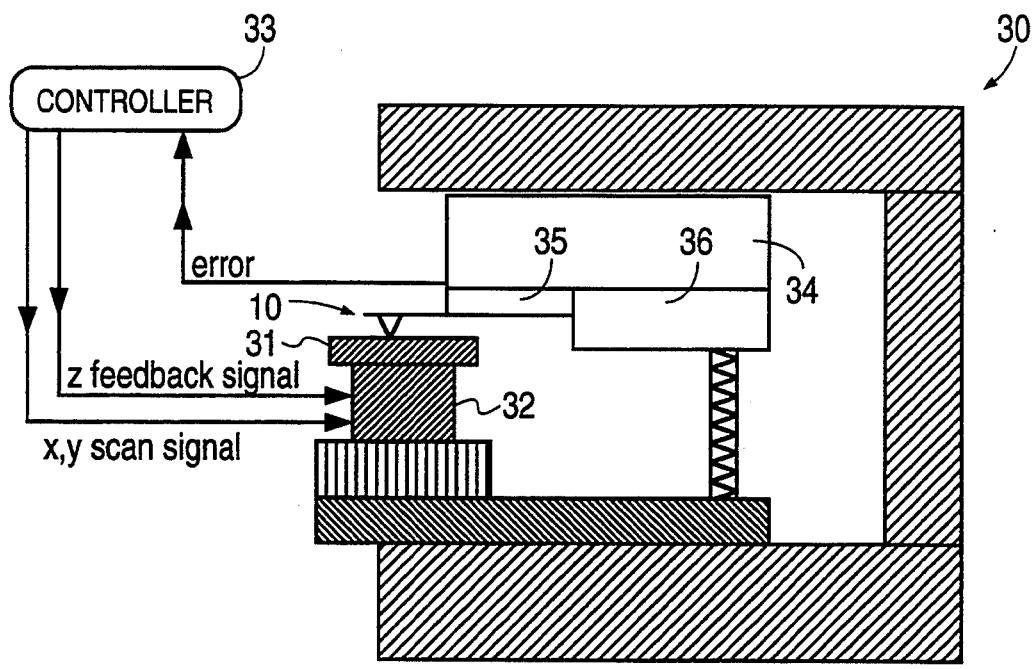
FIG. 2 illustrates a schematic view of a near field optical microscope including the cantilever of this invention.

A general schematic view of an NSOM 30 containing cantilever 10 is illustrated in FIG. 2. Cantilever 10 is positioned over a sample 31, which is mounted on top of a piezoelectric scanner 32. Piezoelectric scanner 32, which typically contains a piezoelectric tube of the kind well known in the art, responds to an x,y scan signal and a z feedback signal from a controller 33. The x,y scan signal causes scanner 32 to transpose sample 31 horizontally in a raster pattern, so as to permit the tip of cantilever 10 to scan the sample. The z feedback signal regulates the vertical position of sample 31 so as to maintain a constant separation between tip 13 (aperture 25) and the surface of sample 31.

Cantilever 10 extends from a head unit 34, which contains a piezoelectric element 35 capable of vibrating cantilever 10 in a vertical direction. Head unit 34 also contains a bridge circuit 36 (see FIG. 3) which detects the resistance of piezoresistor 18 and delivers an output representative of the resonant frequency of cantilever 10. Head unit 34 converts the output of bridge circuit 36 into a DC voltage which is compared with a reference voltage to obtain an error signal. The error signal is sent to controller 33, which uses it to generate the z feedback signal which is sent to scanner 32.

In the operation of an NSOM, the aperture from which the light beam emerges (in this case, aperture 25) is held extremely close to the surface of the sample. This distance may be on the order of 100 Å, for example, and it is crucially important that the gap between the aperture and the sample be held constant. How this is done will now be described with reference to FIG. 2.

As the tip of cantilever 10 approaches very closely to the surface of the sample, Van der Waals or other forces between atoms in the region of aperture 25 and the surface of the sample come into play. These forces tend to attract tip 13 to the sample. The strength of these attractive forces depends on the separation between the apex of tip 13 (aperture 25) and the surface of the sample. The gradient of these forces in turn affects the resonant frequency of cantilever 10.

Referring again to FIG. 2, piezoelectric unit 35 imposes a vertical vibration on cantilever 10. Typically, this vibration is at a frequency in the range of 10–500 kHz and has an amplitude of approximately 5 Å.

Figure 3:
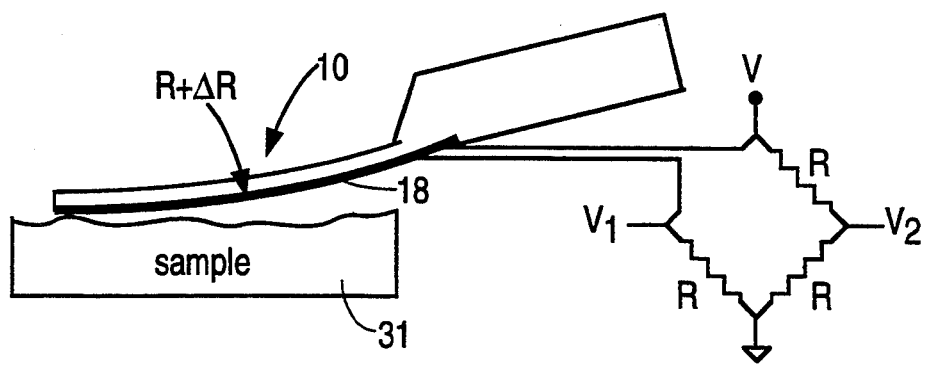
FIG. 3 illustrates schematically the bridge circuit used to detect changes in the resistance of the piezoresistor.

FIG. 3 illustrates schematically bridge circuit 36, which may be used to detect the resistance of piezoresistor 18. Assuming that the resistance of piezoresistor 18 and each of the resistors in bridge circuit 36 is equal to R, $V_1$ equals $V_2$ when the cantilever is undeflected. When it is deflected so that the resistance of piezoresistor becomes $R + \Delta R$, $V_1 - V_2$ equals:

$$V_1 - V_2 = V \frac{\Delta R}{4R}$$

Thus, as cantilever 10 vibrates, the voltage difference $V_1 - V_2$ oscillates at the same frequency, and this differential voltage is used to detect the frequency at which cantilever 10 is vibrating.

As the gap between tip 13 and sample 31 varies, the resonant frequency of cantilever 10 also varies due, as described above, to variations in the attractive forces between tip 13 and sample 31. Using the output of bridge circuit 36, head 34 converts the vibrational frequency of cantilever 10 into a DC voltage and compares it to a known reference voltage. The difference between these voltages is sent to controller 33 as an error signal, and using known techniques controller 33 sends an appropriate feedback signal to scanner 32, changing the width of the gap between tip 13 and sample 31 so as to reduce the error signal to 0. Thus, as cantilever 10 scans the surface of sample 31, encountering surface features of various heights and dimensions, this feedback system operates to maintain the gap between tip 13 and sample 31 at a constant value.

The light beam which emerges from aperture 25 is reflected from sample 31 and passes back through waveguide 12. A photodetector in head 34 senses the reflected or scattered light from the sample and uses this information to generate a representation of the surface of sample 31 as it is scanned by cantilever 10. In an alternative embodiment, a lens and photodetector could be positioned laterally in relation to the tip to sense the light directly as it is reflected or scattered from the sample. The light beam may be transmitted through sample 31 and detected by a photodetector on the other side of the sample. See, E. Betzig and J. K. Trautman, "Near Field Optics: Microscopy, Spectroscopy, and Surface Modification Beyond the Diffraction Limit", Science, Vol. 257, pp. 189–195, 10 Jul. 1992, which is incorporated herein by reference.

Alternatively, NSOM 30 may be operated as a force microscope. Tip 13 is brought into contact with the surface of sample 31. As the sample is scanned, the error signal generated by head 36, which represents the deflection of cantilever 10 and therefore the force between tip 13 and sample 31, is used to generate a topographical representation of the sample. NSOM 30 may also be operated in the attractive or non-contact mode. See, D. Rugar and P. Hansma, "Atomic Force Microscopy", Physics Today, pp. 23–30, October 1990; E. Betzig, P. L. Finn and J. S. Weiner, "Combined Shear Force and Near-Field Scanning Optical Microscopy", Appl. Phys. Lett., Vol. 60, pp. 2484–2486, 18 May 1992; and R. Toledo-Crow, P. C. Yang, Y. Chen and M. Vaez-Iravani, "Near-Field Differential Scanning Optical Microscope with Atomic Force Regulation", Appl. Phys. Lett., Vol. 60, pp. 2975–2979, 15 Jun. 1992, all of which are incorporated herein by reference.

A process of fabricating cantilever 10 will now be described, with reference to FIGS. 4A–4M.

Figure 4A:
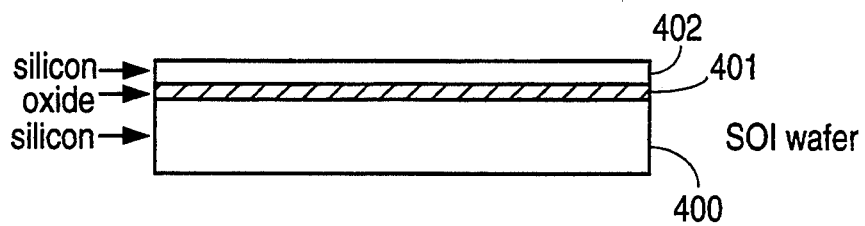
FIGS. 4A–4M illustrate a process of fabricating the cantilever shown in FIGS. 1A–1D.

The starting material is a <100> type silicon-on-insulator (SOI) wafer, as shown in FIG. 4A, in which 400 represents a bottom silicon layer, 401 represents an $SiO_2$ layer and 402 represents a top silicon layer. The SOI wafer may be formed by oxidizing two wafers, bonding them together, and lapping one of the two wafers to the desired thickness of layer 402. Alternatively, oxygen may be implanted in a silicon wafer and annealed so as to form a buried oxide layer. An intrinsic silicon layer is then grown epitaxially to the desired thickness. In one embodiment, $SiO_2$ layer 401 is 4000 Å thick and the top silicon layer 402 is 10 $\mu m$ thick.

Figure 4B:
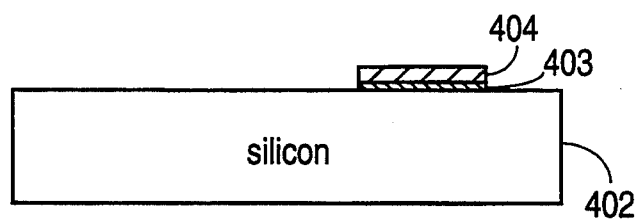
Figure 4C:
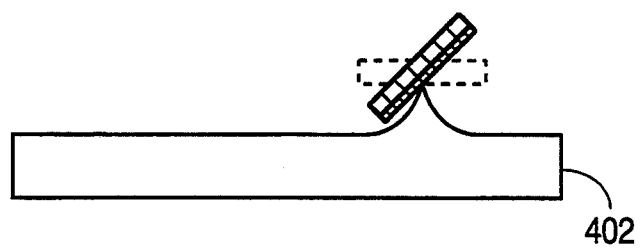
Figure 4D:
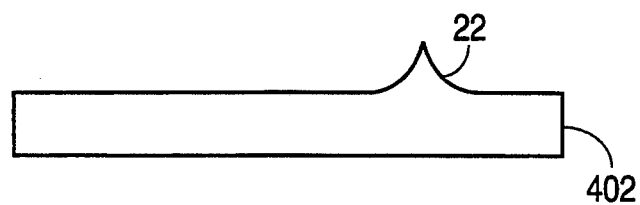

FIGS. 4B–4D illustrate the fabrication of conical member 22 in top silicon layer 402. As shown in FIG. 4B, a masking material consisting of an oxide layer 403 and a photoresist layer 404 is patterned into a circle on the top surface of layer 402. The masking material may alternatively contain a nitride, a refractory metal or any other material that is not etched by the silicon etchant. The thickness of the masking material depends on the desired height of the tip and the etch selectivity between the masking material and the silicon substrate. An oxide layer 2000 Å thick is sufficient to make tips 10 $\mu m$ in height and a 1000 Å layer of evaporated aluminum may be used to make tips 100 $\mu m$ in height.

Next, as shown in FIG. 4C, silicon layer 402 is etched in either a plasma or wet etchant. Although most of the etching occurs in the vertical direction, there is some finite undercutting of the mask. By carefully monitoring the etching process through periodical optical inspections, the etching can be stopped just prior to or just after the masking material caps have fallen off. These two possibilities are illustrated in FIG. 4C. In practice, the caps usually fall off and come to rest against the tip. The cap is then selectively removed and conical member 22 is exposed, as shown in FIG. 4D.

A possible problem with the foregoing process is that the etching conditions and durations are critical for the proper formation of the conical member. Since etching rates and durations are two of the least controllable fabrication parameters, a fabrication process that relies heavily on them is usually very difficult to reproduce from wafer to wafer or even across a single wafer. Plasma etching is very non-uniform so that the cones in the center may take longer to form than the cones at the perimeter of the wafer. If wet etching is used, the etch time becomes more critical since the caps are washed away in the etchant and the cones are quickly attacked. It has been found that after the initial fabrication process the apexes of the cones typically have radii of curvature of approximately 500 Å.

Figure 4E:
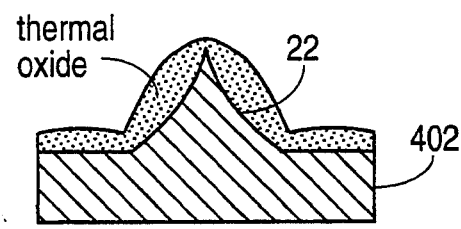
Figure 4F:
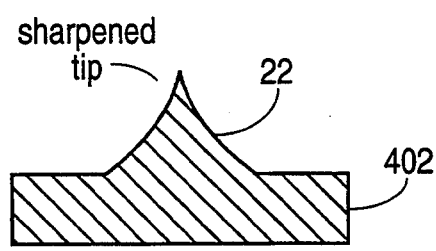

In order to make the cones sharper and at the same time increase their uniformity, they can be sharpened using a low temperature thermal oxidation process, as illustrated in FIGS. 4E and 4F. FIG. 4E shows conical member 22 after it has been thermally oxidized at 950° C. to form an oxide layer 2000 Å to 1 $\mu m$ in thickness. When the oxide is selectively removed in an HF acid solution, the conical member 22 is sharper and has a higher aspect ratio than it had prior to oxidation. The resulting form of conical member 22 is shown in FIG. 4F. This process may be repeated several times to attain the required degree of sharpness. The mechanism of oxidation sharpening is described in detail in R. B. Marcus and T. T. Sheng, "The Oxidation of Shaped Silicon Surfaces", J. Electrochem. Soc., Vol. 129, No. 6, pp. 1278–1282, June 1982, which is incorporated herein by reference.

Figure 4G:
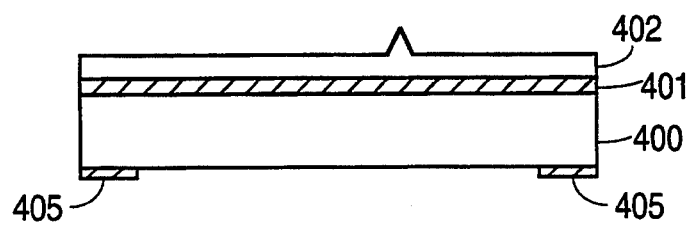

FIG. 4G shows the sharpened conical member 22 protruding from the remains of top silicon layer 402. Masking layer 405 is an oxide-photoresist layer which is formed at the same time as layers 403 and 404 are formed on the top of silicon layer 402 (FIG. 4B). The masking layers on the top and bottom of the substrate are aligned with each other.

After conical member 22 is formed, boron is implanted in layer 402 at a dose of $5 \times 10^{14}$ cm$^{-2}$ and an energy of 80 keV to form layer 17 (piezoresistor 18). This results in a sheet resistance of 270 $\Omega$. Piezoresistor 18 is formed in a U-shape by masking the top surface of the substrate by a known photolithographic technique.

Figure 4H:
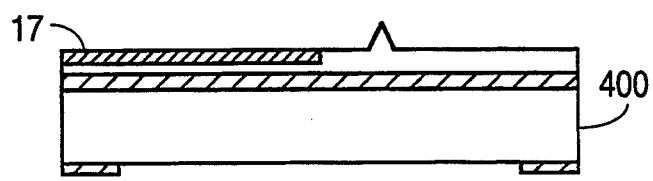

A metal mask may be used. The results of this process are illustrated in FIG. 4H.

Figure 4I:
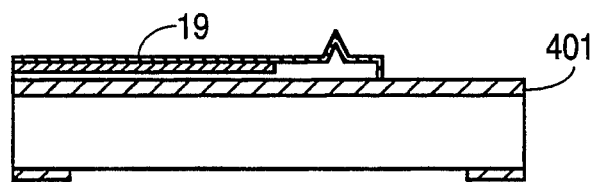
Figure 4J:
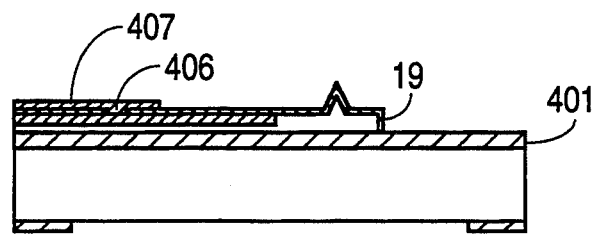

Next, an oxide layer is formed to protect the silicon from subsequent processing. A layer 300 Å thick may be formed by wet oxidation at 900° C. for 10 minutes. A layer of photoresist is applied, and the shape of the cantilever is defined by standard photolithography techniques. During this and subsequent photolithography steps a thick photoresist layer is used to protect the tip. The silicon is then etched in a plasma etcher until oxide layer 401 stops the etch. After the photoresist is stripped, the oxide layer is removed and a new, thicker (e.g. 5000 Å) thermal oxide layer 19 is grown. The result is illustrated in FIG. 4I. This last oxidation step causes the boron to diffuse into the cantilever. Alternatively, the boron implantation could be done after the oxidation.

Another photolithography step is used to open contact holes 406 in the oxide layer 19. An aluminum layer 407 (containing 1% silicon) is sputtered, with the results shown in FIG. 4J. In one embodiment, layer 407 is 1 µm thick. Aluminum layer 407 is patterned into metal lines by a photolithography process. A forming gas anneal at 400° C. for 45 minutes anneals the contacts.

Figure 4K:
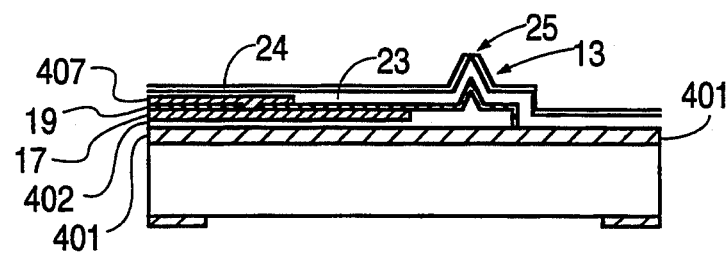

$Si_3N_4$ layer 23 is then deposited on oxide layer 19 by means of a low stress LPCVD (low pressure chemical vapor deposition) process. In this embodiment, $Si_3N_4$ layer 23 is about 3000 Å thick. Al layer 24, preferably about 500 Å thick, is then deposited on $Si_3N_4$ layer 23. As described above, $Si_3N_4$ layer 23 forms a planar waveguide, bounded by oxide layer 19 and Al layer 24. $Si_3N_4$ conforms to the shape of conical member 22 and, with Al layer 24 on the outside, forms tip 13. Optical aperture 25 is opened at the apex of tip 13 by a focused ion beam (FIB) process. An imaging mode of the FIB generator is used to identify the location of the apex, and the FIB generator is then turned up to form optical aperture 25. The results of these processing steps are illustrated in FIG. 4K.

Figure 4L:
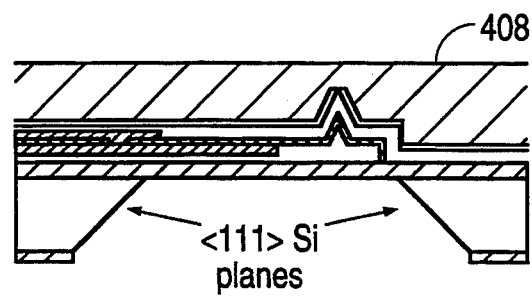
Figure 4M:
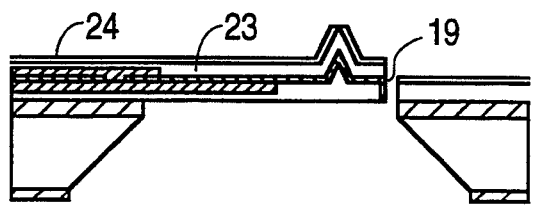

Finally, as illustrated in FIG. 4L, the silicon is etched from the back of the substrate to free the cantilever. This etch is performed with an ethylenediamine/pyrocatechol (EDP)/water solution. However, since the EDP solution attacks aluminum, the top of the cantilever is protected with a thick layer 408 of polyimide. A layer at least 10 µm thick is needed to insure that the cantilever and the tip are completely protected. EDP etches silicon preferentially along the <100> crystallographic plane but not the <111> plane. Therefore the etch defines a precise rectangular opening on the bottom, which is defined by four <110> lines. The EDP will stop etching when it reaches the bottom of oxide layer 401. Oxide layer 401 is then removed in a buffered oxide etch solution, and polyimide layer 408 is stripped in an oxygen plasma. The freed cantilever is illustrated in FIG. 4M.

Advantageously, a number of cantilevers are fabricated at the same time on a silicon wafer. If so, the EDP etch may also be to open grooves in the backside of the wafer, which are then used to dice the wafer.

Figure 5A:
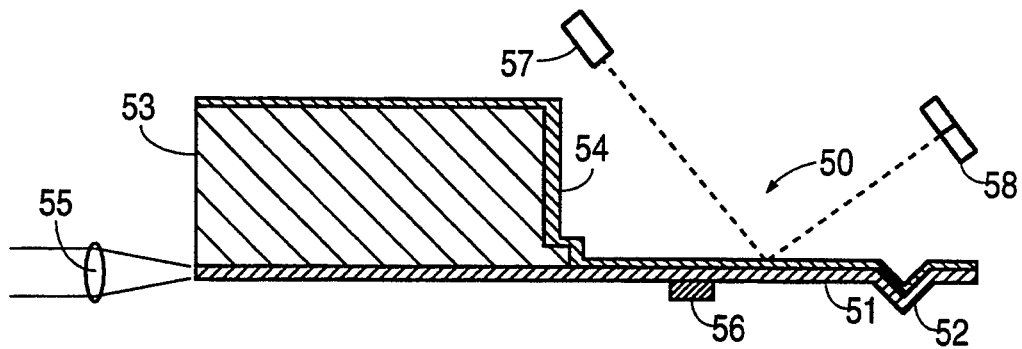
FIG. 5A illustrates a cross-sectional view of a second embodiment of the invention.
Figure 5B:
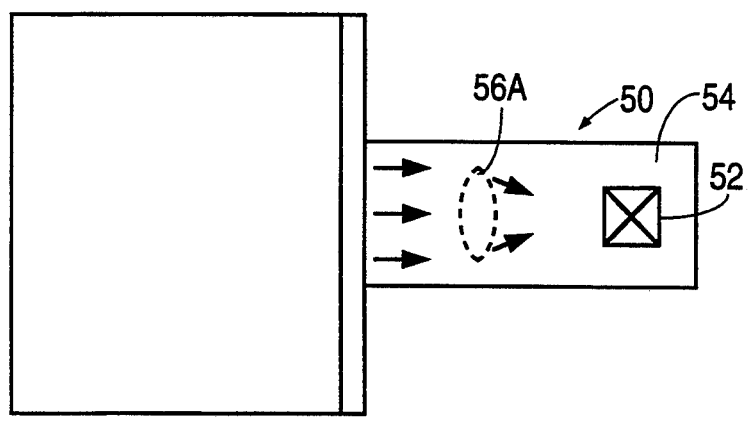
FIG. 5B illustrates a top plan view of the second embodiment.

FIGS. 5A and 5B illustrate cross-sectional and top plan views, respectively, of an alternative cantilever in accordance with this invention. Cantilever 50 includes a silicon nitride ($Si_3N_4$) layer 51 which is formed into a pyramidal tip 52. Layer 51 is anodically bonded to a pyrex glass substrate 53. The top surface of cantilever 50 is covered with a Cr/Au layer 54. A light beam is introduced into the cantilever by means of a lens 55. A convex lens-shaped section 56A is formed as a thicker region of layer 51. Since the velocity of the light in a waveguide varies inversely with the thickness of the waveguide, section 56A focuses the optical energy at the tip 52.

Cantilever 50 does not contain a piezoresistor. Therefore, the deflection of the cantilever must be detected by a different arrangement. As shown in FIG. 5A, a laser diode 57 directs a laser beam against a mirrored surface on the backside of cantilever 50, where it is reflected to a position sensitive photodetector (PSPD) 58. As the cantilever bends, the laser beam strikes a different position on PSPD 58, and thus PSPD 58 delivers an output which is analogous to the output of piezoresistor 18 in the prior embodiment. This technique of sensing the deflection of the cantilever is described in U.S. Pat. No. 5,144,833 to Amer et al., which is incorporated herein by reference.

Light enters $Si_3N_4$ layer 51 through lens 55 and is directed by lens-shaped section 56A to tip 54. It emerges through a small aperture at the apex of tip 54 and strikes the surface of a sample (not shown). The remaining components of the NSOM may be similar to those described above and illustrated in FIG. 2.

Figure 6A:
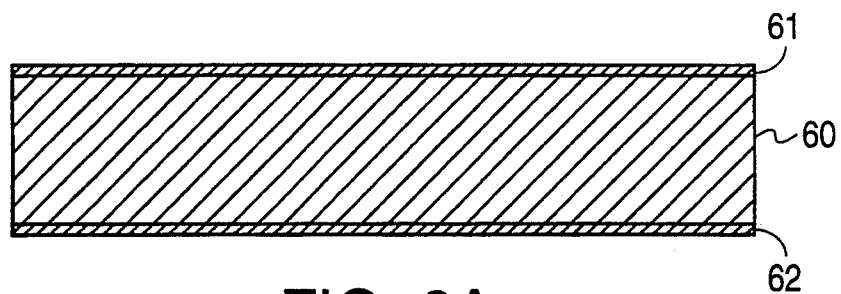
FIGS. 6A–6N illustrate a process of fabricating the second embodiment.
Figure 6B:
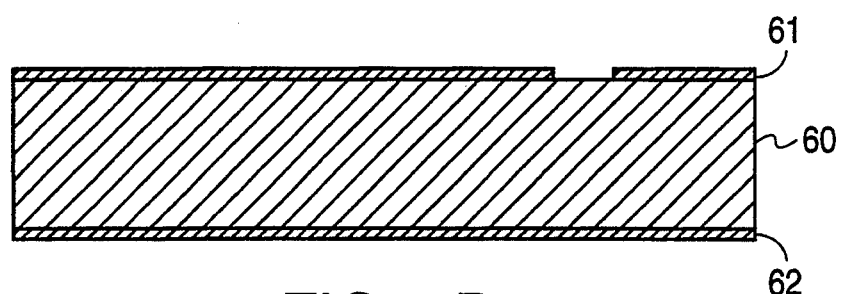
Figure 6C:
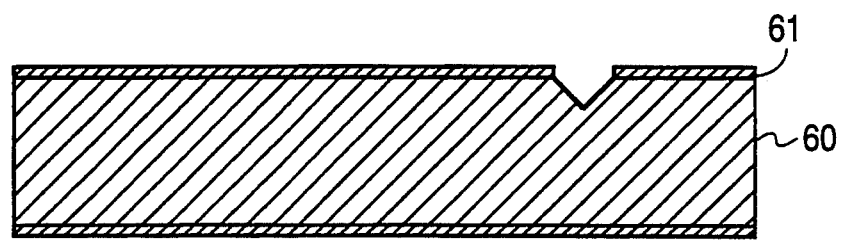
Figure 6D:
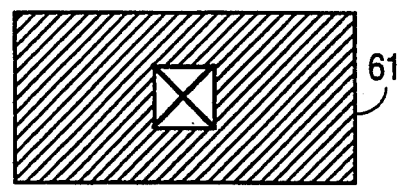

The fabrication of cantilever 50 begins with an Si substrate 60, shown in FIG. 6A, which is preferably a portion of a wafer. $SiO_2$ layers 61 and 62 are formed on the top and bottom surface of Si substrate 60. As shown in FIG. 6B, a square opening is defined and etched in layer 61. Next, as shown in FIG. 6C, an anisotropic Si etchant in KOH solution is applied to the substrate. This etchant attacks the <100> plane of Si layer 60, creating a four-sided pyramidal depression in the top surface of layer 60, the sides of which coincide with four intersecting <111> planes. A top view of this depression is illustrated in FIG. 6D.

Figure 6E:
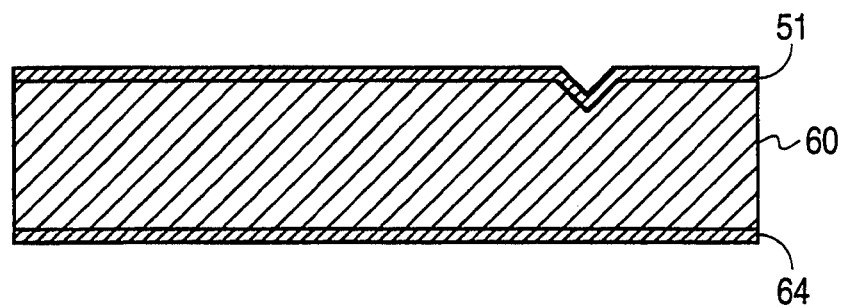

$SiO_2$ layers 61 and 62 are then removed, and $Si_3N_4$ layers 51 and 64 are formed by chemical vapor deposition on the top and bottom surfaces of substrate 60. Layers 51 and 64 are preferably about 5000 Å thick. The substrate is then annealed in steam at 1100° C. to prepare it for anodic bonding. The result is illustrated in FIG. 6E.

Figure 6F:
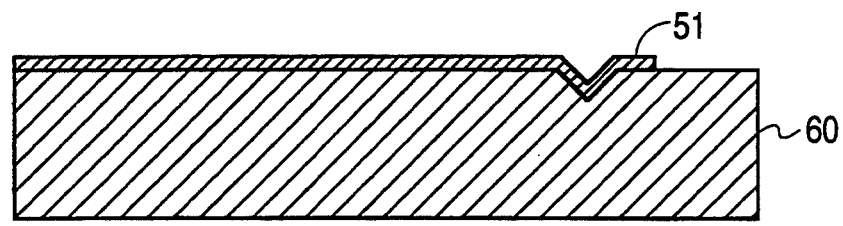
Figure 6G:
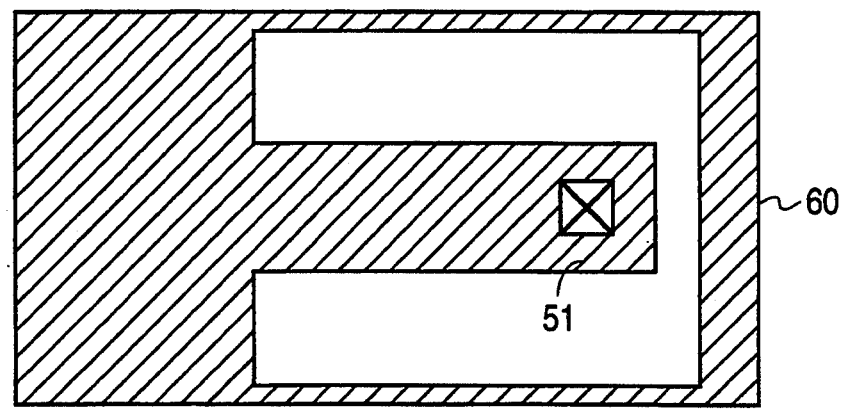

Next, a dry plasma etcher is used to remove layer 64, and layer 51 is pattern-etched in the form of the cantilever. FIGS. 6F and 6G show cross-sectional and top views, respectively, of the cantilever after this step is finished.

Figure 6H:
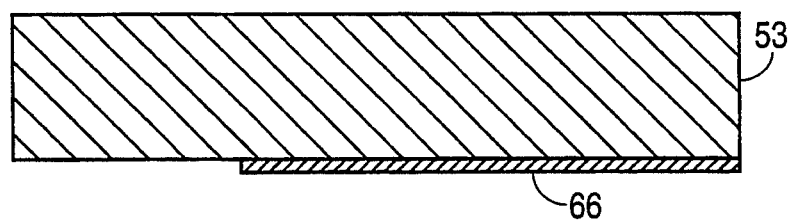
Figure 6I:
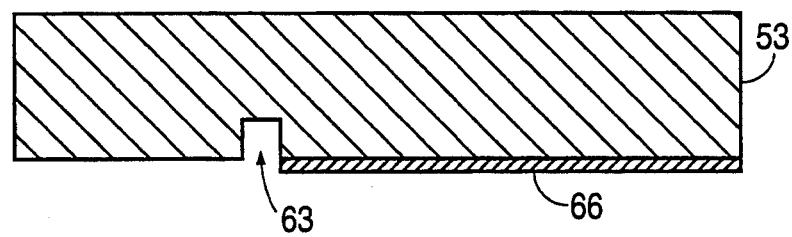

FIG. 6H shows a pyrex glass substrate 53. A Cr layer 66 is formed on the bottom of substrate 53 and patterned and etched to make bond inhibiting areas on the pyrex substrate. A saw cut 63 is then made partially through substrate 53 at the edge of layer 66, as shown in FIG. 6I.

Figure 6J:
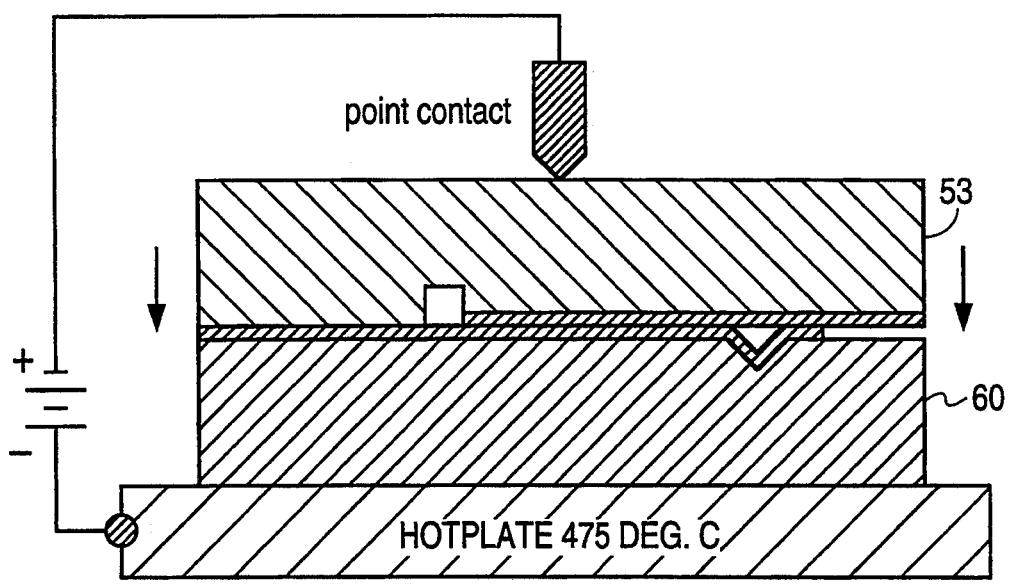

Pyrex substrate 53 is then anodically bonded to substrate 60 by placing substrate 60 on a 475° C. hot plate and applying a positive potential to pyrex substrate 53. This process is illustrated in FIG. 6J.

Figure 6K:
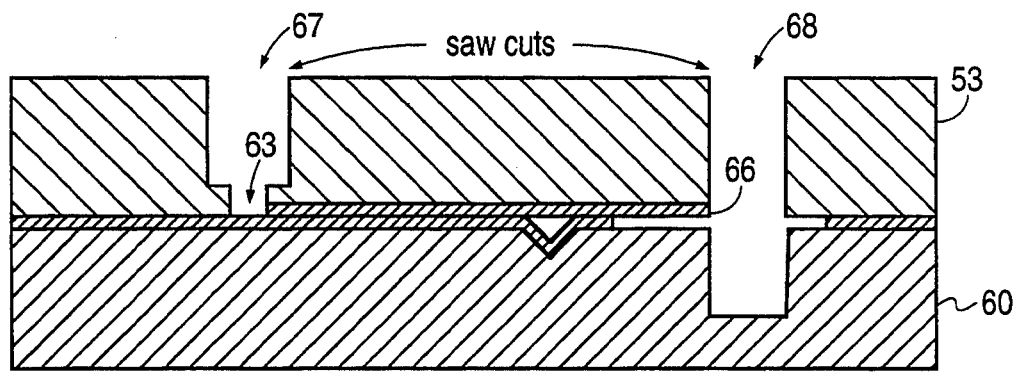

After the bonding has occurred, additional saw cuts 67 and 68 are made in pyrex substrate 53. Saw cut 67 extends to saw cut 63 previously made in substrate 53, and saw cut 68 extends into Si substrate 60. The structure at the conclusion of this process is shown in FIG. 6K.

Figure 6L:
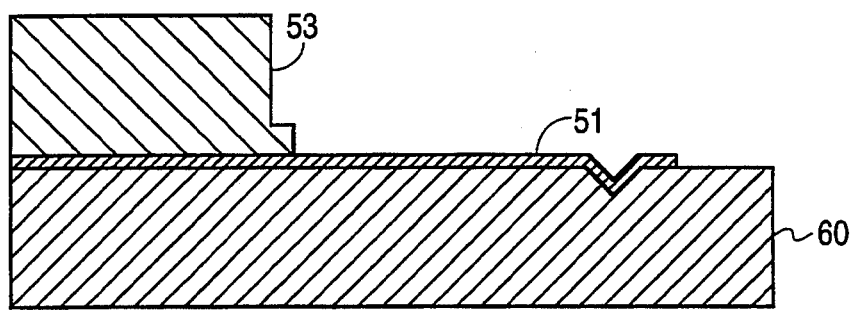
Figure 6M:
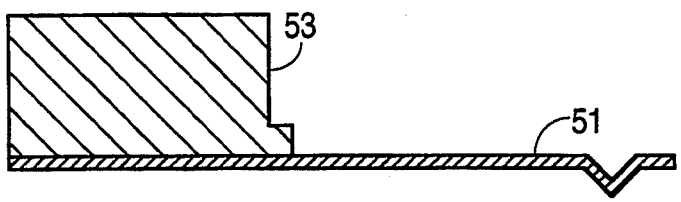
Figure 6N:
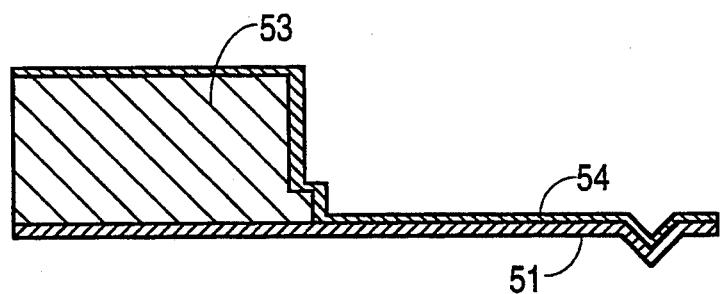

Substrate 60 is then broken at saw cuts 67 and 68. Since Cr layer 66 does not bond to $Si_3N_4$ layer 51, the structure shown in FIG. 6L results. Si substrate 60 is then etched in a KOH etchant, leaving the bottom surface of Si$_3$N$_4$ layer 51 exposed, as shown in FIG. 6M. The top of the cantilever is then coated with Cr/Au layer 54, resulting in the structure shown in FIG. 6N.

Figure 5C:
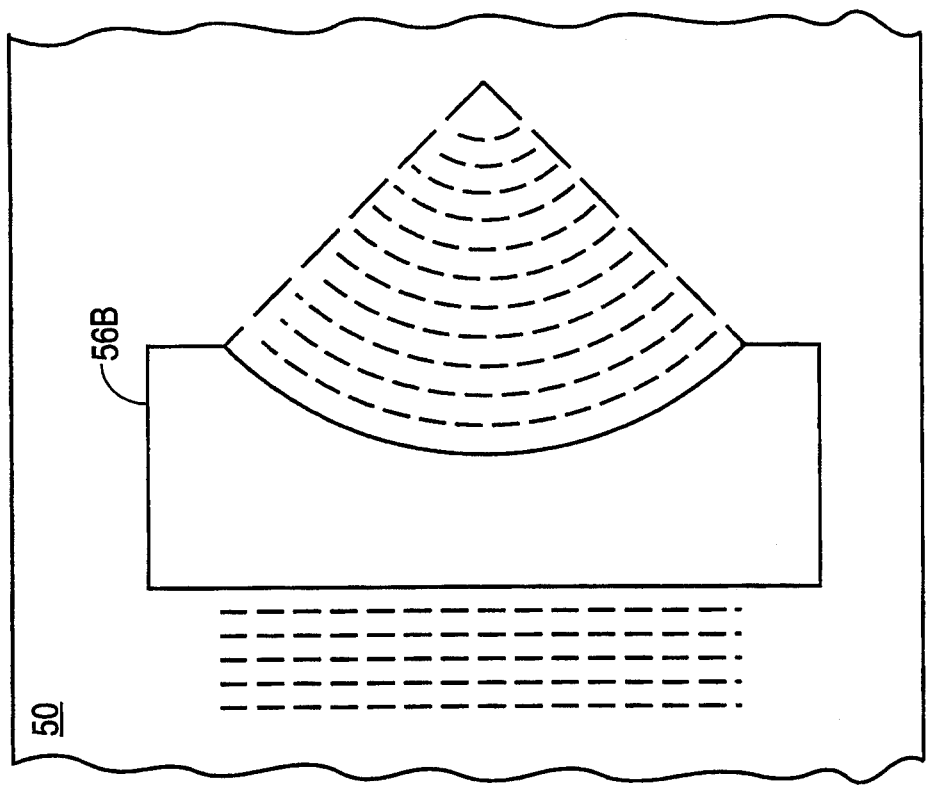
FIG. 5C illustrates a top plan view of a concave lens for focusing the light beam at the tip of the cantilever.

Convex lens-shaped section 56A may be formed by masking and etching Si$_3$N$_4$ layer 51 to the shape illustrated in FIG. 5B. The area which is to constitute lens-shaped section 56A is masked, and the remainder of layer 51 is etched. Alternatively, a thinner, concave lens-shaped section could be formed by reducing the thickness of layer 51. This could be done by masking the remainder of layer 51, and etching a concave-shaped section 56B of the layer, as illustrated in FIG. 5C. As noted above, the velocity of light in a planar waveguide is inversely proportional to the thickness of the waveguides. Therefore, the concave side of the lens causes the light rays to converge at the tip of the cantilever.

Figure 5D:
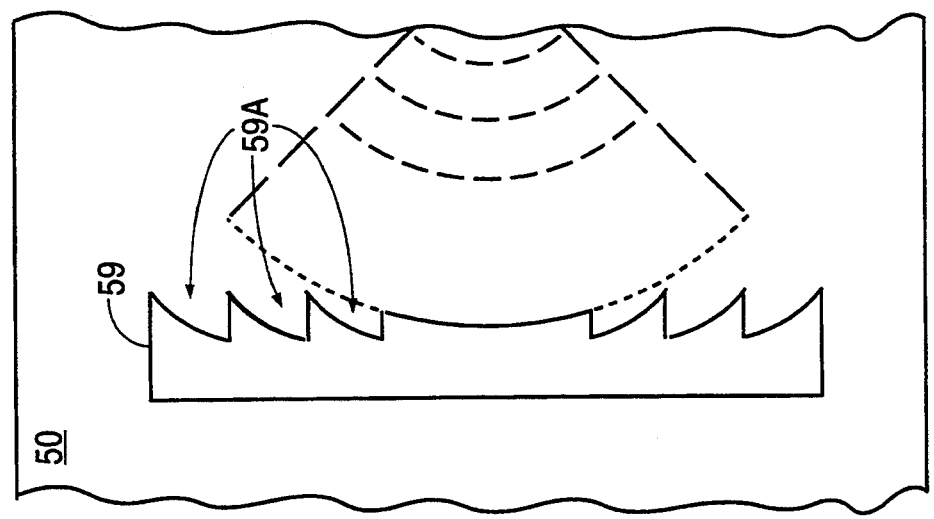
FIG. 5D illustrates a top plan view of a lens having a Fresnel zone plate for focusing the light beam at the tip of the catilever.

FIG. 5D illustrates still another technique of focusing the light at the tip, using a thinned, Fresnel zone plate 59, having a number of steps 59A. The steps 59A are positioned at radii equal to one wavelength, so that positive interference occurs as the waves leave Fresnel zone plate 59. Fresnel zone plate 59 may advantageously be formed by ion-milling, as described in Tsai, "Integrated Acoustooptic Circuits and Applications", IEEE Transactions on Ultrasonics, Ferroelectrics, and Frequency Control, Vol. 39, No. 5, September 1992, which is incorporated herein by reference in its entirety.

Numerous alternative structures known in the art of optical waveguides are available for focusing the light at the tip.

Figure 7A:
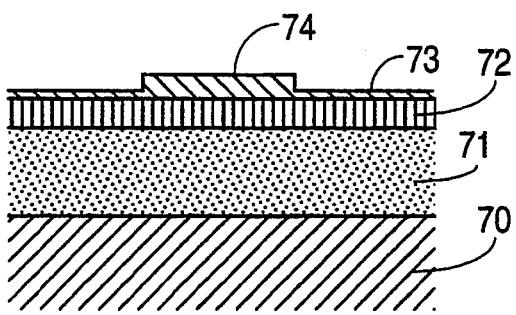
FIGS. 7A and 7B illustrate alternative designs of the waveguide in transverse cross section.
Figure 7B:
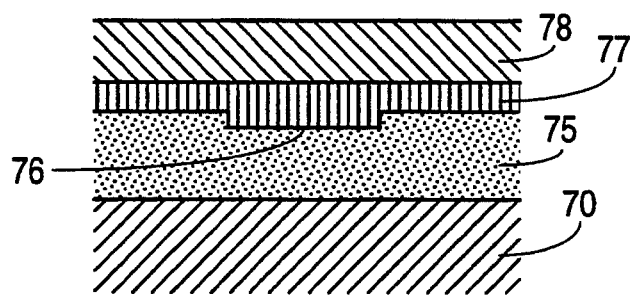

FIGS. 7A and 7B illustrate transverse cross-sectional views of alternative waveguides which may be used in the cantilever. In both of these embodiments the light beam is channeled towards the center of the waveguide. In FIG. 7A, 70 represents a silicon substrate, 71 represents an SiO$_2$ layer, 72 represents an SiON layer (which is the waveguide), and 73 represents an SiO$_2$ layer. In a preferred embodiment, SiO$_2$ layer 71 is approximately 2 $\mu$m thick and SiON SiO$_2$ layer 72 is approximately 0.5 $\mu$m thick. Layer 73 has a ridge 74 formed in it, which in this embodiment is 2-20 $\mu$m wide. SiO$_2$ layer 73 is about 0.1 $\mu$m thick generally and ridge 74 is about 0.5 $\mu$m thick. The added thickness of SiO$_2$ layer 73 in the region of ridge 74, by the principle of optical confinement, keeps the light beam in SiON layer 72 in the area under ridge 74.

In FIG. 7B, substrate 70 is the same as the substrate shown in FIG. 7A. However, SiO$_2$ layer 75 is formed with a channel 76. Above layer 75 is a SiON layer 77 and a SiO$_2$ layer 78. In the preferred embodiment, channel 76 is 2-20 $\mu$m wide, and 0.2-0.3 $\mu$m deep. SiO$_2$ layer 75 is about 2 $\mu$m thick, SiON layer 77 is about 0.2 $\mu$m thick (in areas away from channel 76), and SiO$_2$ layer 78 is about 1 $\mu$m thick. Light travelling in SiON layer 77 tends to remain concentrated in the region of channel 76.

Figure 8:
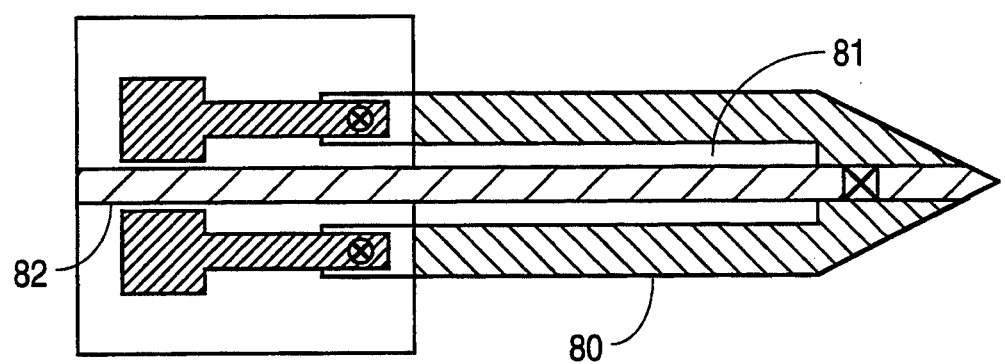
FIG. 8 illustrates a bottom plan view of a third embodiment according to the invention.

The cantilever-waveguide combination of this invention may be formed in a wide variety of configurations. Another alternative is illustrated in FIG. 8. Cantilever 80 is somewhat similar to cantilever 10 (as shown in FIG. 1C), except that the central portion of the cantilever inside the piezoresistor has been removed, leaving an open space 81. A waveguide 82 is formed along the center of cantilever 80 so that it bridges the open central area. Waveguide 82 may be a layer of nitride with a rectangular cross section and a layer of metal deposited on its exposed surfaces.

What has been described is a family of cantilever-waveguide configurations which may be fabricated by batch processes. Many members of the family may be used in an instrument which operates alternatively in an NSOM mode or an AFM mode. While in the embodiments shown above, a piezoresistor and a laser beam have been used to detect the deflection of the cantilever, other types of deflection detectors known in the art may be substituted for the piezoresistor. These other deflection detectors are, for example, based on electron tunneling, as shown in U.S. Pat. No. Re 33,387; optical interferometry techniques; and capacitive detectors. The cantilever and waveguide may likewise be formed in a wide variety of configurations. The broad principles of this invention are intended to include all such alternative embodiments.

I claim:

1. A cantilever for use in a near field optical scanning microscope, the cantilever comprising:
   a flexible cantilever member having a free end and a fixed end,
   a tip formed near the free end of the cantilever member, the tip extending from the cantilever member in a direction substantially perpendicular to a longitudinal axis of the cantilever member;
   an optical waveguide positioned along the cantilever member and extending to an apex of the tip, an aperture for allowing light to escape from the waveguide being formed near the apex of the tip.

2. The cantilever of claim 1 wherein the optical waveguide has a first surface and a second surface, the first and second surfaces of the waveguide being substantially planar and parallel to each other.

3. The cantilever of claim 2 wherein the optical waveguide comprises a channel region, the thickness of the waveguide in the channel region being greater than the thickness of the waveguide in regions outside the channel region.

4. The cantilever of claim 2 comprising a buffer layer adjacent the second surface of the waveguide, the buffer layer having a ridge region, the thickness of the buffer layer in the ridge region being greater than the thickness of the buffer layer in regions outside the ridge region.

5. The cantilever of claim 2 wherein the waveguide comprises a means of focusing a beam of light at the tip.

6. The cantilever of claim 5 wherein the means of focusing comprises a convex lens.

7. The cantilever of claim 5 wherein the means of focusing comprises a concave lens.

8. The cantilever of claim 5 wherein the means of focusing comprises a Fresnel zone plate.

9. The cantilever of claim 1 wherein the tip is conical in shape.

10. The cantilever of claim 1 wherein the tip is tetrahedral in shape.

11. The cantilever of claim 1 wherein the cantilever comprises a piezoresistor for detecting bending of the cantilever.

12. The cantilever of claim 11 wherein the piezoresistor comprises doped silicon.

13. A near field scanning optical microscope (NSOM) comprising:
   the cantilever of claim 1;
   a scanner for scanning the cantilever with respect to a sample positioned in the NSOM;
   a light source;

a means for directing a beam of light from the light source into the optical waveguide of the cantilever; and a means of detecting the beam of light after it strikes the sample.

14. The NSOM of claim 13 further comprising:

a detection means for detecting the deflection of the cantilever;

a feedback control system connected to receive the output of the detection means; and a means for altering the distance between the cantilever and the sample in response to an output from the feedback control system.

15. The NSOM of claim 14 wherein the detection means comprises a piezoresistor.

16. The cantilever of claim 1 wherein the optical waveguide is capable of carrying light in at least one of the transverse electric (TE) mode and the transverse magnetic (TM) mode.

17. The cantilever of claim 1 wherein the optical waveguide comprises $Si_3N_4$.

18. The cantilever of claim 1 wherein the optical waveguide comprises one of a channel waveguide and a film waveguide.

19. The cantilever of claim 1 further comprising optical energy passing through the waveguide, the waveguide having a thickness approximately equal to one wavelength of said optical energy.

20. The cantilever of claim 1 further comprising a capacitive plate positioned adjacent said cantilever member.

21. The cantilever of claim 20 wherein a DC voltage applied to the capacitive plate displaces the cantilever member from a neutral position.

22. The cantilever of claim 20 wherein an AC voltage applied to the capacitive plate excites a mechanical resonance of the cantilever member.

23. The cantilever of claim 1 comprising a structure for focusing light at the tip.

24. The cantilever of claim 1 further comprising a structure for channeling light toward a centerline of the waveguide.

25. The cantilever of claim 1 wherein the tip is sharpened by an oxidation sharpening process.

26. The cantilever of claim 11 wherein the piezoresistor is U-shaped.

27. The cantilever of claim 26 wherein the cantilever member comprises arms extending on opposite sides of an open space, the optical waveguide being formed along a centerline of the cantilever member.

28. The NSOM of claim 14 wherein the cantilever deflects in response to an attractive force such as van der Waals force.

29. The NSOM of claim 14 further comprising a capacitive plate positioned adjacent said cantilever.

30. The NSOM of claim 29 wherein a DC voltage applied to the capacitive plate displaces the cantilever from a neutral position.

31. The NSOM of claim 29 wherein an AC voltage applied to the capacitive plate excites a mechanical resonance of the cantilever.

32. The NSOM of claim 14 wherein the detection means comprises a capacitive plate.

33. The NSOM of claim 32 wherein a DC voltage is applied to the capacitive plate to displace the cantilever from a neutral position.

34. The NSOM of claim 32 wherein an AC voltage applied to the capacitive plate excites a mechanical resonance of the cantilever.

* * * * *